(12) United States Patent
Hwang

(10) Patent No.: US 8,805,332 B2
(45) Date of Patent: Aug. 12, 2014

(54) DEVICE AND METHOD FOR STORING SUBSCRIBER INFORMATION IN MOBILE TERMINAL

(75) Inventor: Gyu Hong Hwang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 379 days.

(21) Appl. No.: 13/289,848

(22) Filed: Nov. 4, 2011

(65) Prior Publication Data

US 2012/0157066 A1    Jun. 21, 2012

(30) Foreign Application Priority Data

Dec. 16, 2010 (KR) ........................ 10-2010-0128860

(51) Int. Cl.
| | | |
|---|---|---|
| *H04L 12/58* | (2006.01) | |
| *H04W 4/00* | (2009.01) | |
| *H04M 1/64* | (2006.01) | |
| *G06F 15/16* | (2006.01) | |
| *H04M 1/2745* | (2006.01) | |

(52) U.S. Cl.
CPC ......... *H04M 1/274516* (2013.01); *G06F 15/16* (2013.01); *H04W 4/00* (2013.01)
USPC ..................... 455/412.2; 455/466; 455/412.1; 379/88.12; 709/206

(58) Field of Classification Search
CPC ............ H04W 4/00; H04W 4/12; H04B 1/38; H04L 51/18; H04L 51/28; H04M 1/274516; H04M 1/72547; H04M 2203/544; H04M 2203/18; G06F 15/16; G06F 9/453; G06F 17/212; G06F 17/2247
USPC .................. 370/259, 310; 455/415, 425, 466, 455/556.1, 556.2, 414.1–414.4, 556
See application file for complete search history.

(56) References Cited

U.S. PATENT DOCUMENTS

| | | | | |
|---|---|---|---|---|
| 5,966,652 | A * | 10/1999 | Coad et al. ................. | 455/412.1 |
| 7,613,472 | B2 * | 11/2009 | Northcutt ...................... | 455/466 |
| 7,813,725 | B2 * | 10/2010 | Celik ............................ | 455/415 |
| 8,170,588 | B2 * | 5/2012 | Tamchina et al. ............. | 455/466 |
| 2006/0034434 | A1 * | 2/2006 | Kashi .......................... | 379/93.07 |
| 2006/0035658 | A1 * | 2/2006 | Yoon et al. .................... | 455/518 |
| 2006/0229063 | A1 * | 10/2006 | Koch .......................... | 455/414.1 |
| 2010/0106781 | A1 * | 4/2010 | Gupta .......................... | 709/206 |
| 2010/0120453 | A1 * | 5/2010 | Tamchina et al. ............. | 455/466 |

FOREIGN PATENT DOCUMENTS

KR    10-0877670    12/2008

* cited by examiner

*Primary Examiner* — Nizar Sivji

(57) ABSTRACT

A method stores subscriber information in a mobile terminal. The method includes checking whether a received message includes a plurality of sets of subscriber information when a message is received, checking whether there is registered subscriber information if the message includes subscriber information, and updating the registered subscriber information to different subscriber information included in the message if there is registered subscriber information.

16 Claims, 4 Drawing Sheets

DEVICE AND METHOD FOR STORING SUBSCRIBER INFORMATION IN MOBILE TERMINAL

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Dec. 16, 2010 and assigned Serial No. 10-2010-0128860, the entire disclosure of which is hereby incorporated by reference.

TECHNICAL FIELD OF THE INVENTION

The present invention relates to a device and method for storing subscriber information in a mobile terminal, and more particularly, to a device and method for automatically updating subscriber information by analyzing a received message.

BACKGROUND OF THE INVENTION

The functions of a current mobile terminal are becoming various, thereby providing various communication services. That is, a mobile terminal is providing various kinds of communication functions such as a text message, e-mail and data communication, etc. as well as a calling function. Hence, a mobile terminal contains various sets of subscriber information like e-mail addresses, etc. for performing an e-mail and data communication function, etc. as well as basic phone numbers.

User stores such subscriber information in a phonebook, etc. of a mobile terminal and uses such information. At this time, in case a phone number or an e-mail address is changed by changing the mobile terminal, a user of the mobile terminal should store the changed phone number or e-mail address instead of the existing phone number or e-mail address. Currently, in case a person calls a user whose phone number has been changed, a mobile communication service provider currently informs the person of the changed phone number of the user whose phone number has been changed by a text message. In addition, in case the phone number of a user is changed, a user often informs other users of the changed phone number by a text message or an e-mail, etc.

In such an example, if a user of a mobile terminal receives a message, which informs of a change of subscriber information like a phone number, etc., through a text message or an e-mail, etc., the user should search for corresponding subscriber information from the phonebook, etc. and then store the changed information, which is inconvenient.

SUMMARY OF THE INVENTION

To address the above-discussed deficiencies of the prior art, it is a primary object to provide a device and method for storing subscriber information in a mobile terminal, in which the mobile terminal analyzes content of a received message, and if the received message is a message to inform of a change of subscriber information like a phone number, etc., the mobile terminal automatically stores the changed subscriber information instead of the existing subscriber information.

In accordance with an aspect of the present disclosure, a method for storing subscriber information in a mobile terminal includes: checking whether a received message includes a plurality of sets of subscriber information when a message is received; checking whether there is registered subscriber information if the message includes subscriber information; and updating the registered subscriber information to different subscriber information included in the message if there is registered subscriber information.

In accordance with another aspect of the present disclosure, a method for storing a phone number in a mobile terminal includes: checking whether a received text message is a phone number change message when a message is received; and updating a registered phone number in a phonebook to an unregistered phone number included in the message if the message is a phone number change message.

In accordance with another aspect of the present disclosure, a device for storing subscriber information in a mobile terminal includes: a communication unit that receives a message; a memory that stores a phonebook; a display unit that displays a received message; and a controller that analyzes the received message, and, if the message includes a plurality of sets of subscriber information including registered subscriber information, updates the registered subscriber information to different subscriber information included in the message.

According to the present disclosure, when a message, which informs of a change of subscriber information, is received in a mobile terminal, the mobile terminal can search the text message and the phonebook, and automatically store the changed subscriber information, and thus user does not have to manually search corresponding subscriber information from the phonebook, etc., and change the information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications device. Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In an exemplary embodiment of the present disclosure, when a message is received in a mobile terminal, the mobile terminal analyzes content of the received message, and if the message is a message that informs of a change in subscriber information, the mobile terminal automatically stores changed information of the corresponding subscriber instead of the existing information. Here, there can be two types of messages that inform of a change in the subscriber information. One type is a message that informs of a change of subscriber information, which is received from a communication service provider. The other type is a message that user sends to his acquaintances, which informs of changed subscriber information of the user. Various embodiments of the present disclosure suggest a method in which a mobile terminal can automatically store changed subscriber information in a phonebook, etc. in case a text message related with such a subscriber information change is received.

Here, the subscriber information can be a phone number for call and text message communication and an e-mail address for data communication, etc. The description below refers to the subscriber information being a phone number for brevity. However, in various embodiments of the present disclosure the subscriber information is an e-mail address.

Figure 1:
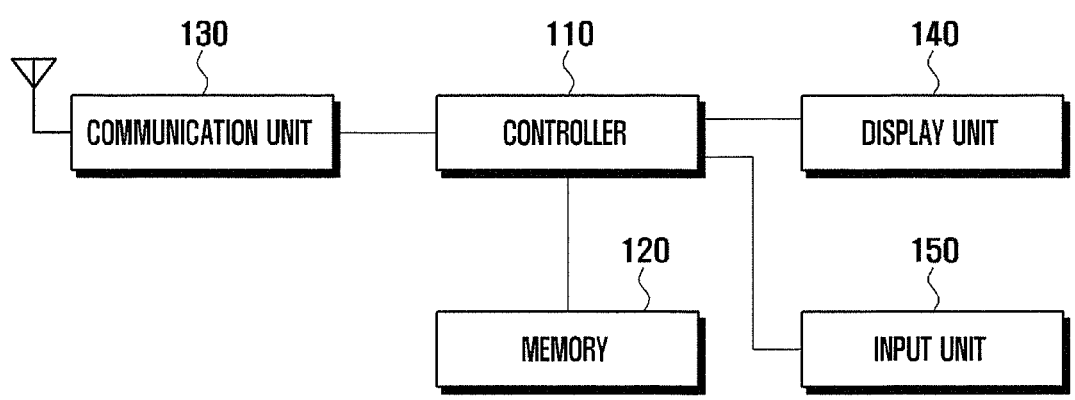
FIG. 1 illustrates a configuration of a mobile terminal.

FIG. 1 illustrates a configuration of a mobile terminal.

Referring to FIG. 1, a communication unit 130 frequency-converts transmitted signals of the baseband to the signals of the RF band and amplifies power to output to the antenna, and low-noise-amplifies received RF signals, frequency-converts the signals to the signals of the baseband, and outputs the converted signals. That is, the RF communication unit 130 may comprise a RF transmitter and a RF receiver.

A memory 120 may comprise a program memory for storing programs that control operation of a mobile terminal and programs that analyze a text message and automatically store changed subscriber information instead of the existing information, and a data memory for storing data generated while a program is executed. The data memory may include a phonebook for storing subscriber information (phone number, etc.).

A controller 110 controls overall operation of a mobile terminal according to the present disclosure. The controller 110 may comprise a modulation and demodulation unit and a CODEC, etc. The modulation and demodulation unit modulates a transmitted signal in a preset modulation method and outputs the modulated signal in the communication unit 130, and demodulates the modulated signal outputted from the communication unit 130 and outputs the demodulated signal. The modulation and demodulation unit may be a MODEM consisting of a modulator and a demodulator, and may use an orthogonal frequency division multiplexing access (OFDMA) or code division multiple access (CDMA) method, etc. The CODEC codes the transmitted signal and outputs the coded signal to the modulation and demodulation unit, and decodes the demodulated signal outputted from the modulation and demodulation unit and outputs the decoded signal. The CODEC may comprise a coder and a decoder. The modulation and demodulation unit and the CODEC may be included in the controller 110, or may be independently configured. An exemplary embodiment of the present disclosure assumes that the modulation and demodulation unit and the CODEC are configured in the controller 110.

The controller 110 controls a function related to calling and communication, etc. The explanation below will be focused on a method for automatically storing changed subscriber information in a memory 120 in case the controller 110 analyzes a received message and the message is a message that informs of a change in subscriber information.

A display unit 140 displays information generated while a program is executed under the control of the controller 110, and an input unit 150 generates key data, etc. for communication and operation commands. Here, the display unit 140 and the input unit 150 may be implemented as an integrally formed touch screen.

Figure 2:
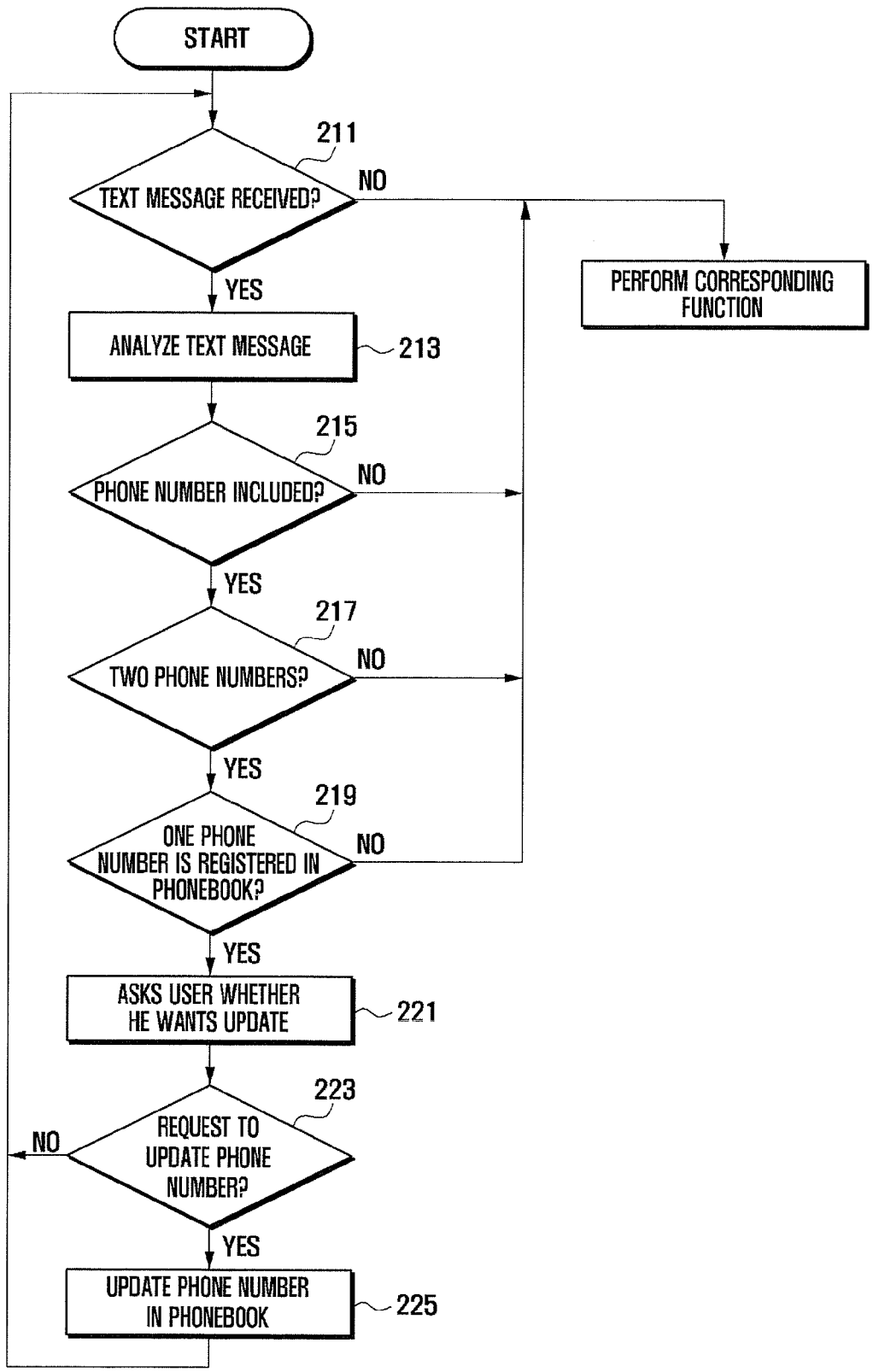
FIG. 2 illustrates a process of automatically storing changed information of a corresponding subscriber when a text message, which informs of a change of subscriber information, is received in a mobile terminal according to the present disclosure.

FIG. 2 illustrates a process of automatically storing changed information of a corresponding subscriber when a text message, which informs of a change of subscriber information, is received in a mobile terminal according to the present disclosure.

In case a person calls a mobile terminal whose subscriber information has been changed due to a change of the terminal, etc., a communication service provider transmits a message that informs of changed subscriber information. An example of such a message (e.g., a phone number change message), which informs of changed subscriber information, is shown in Table 1 below.

TABLE 1

"Phone number change information:
Phone number 01012345678 has been changed
to 01098765432."

In such an example, a user of the mobile terminal should perform a process of storing changed subscriber information by operating a menu, etc. of the mobile terminal. According to various embodiments of the present disclosure, when a message, which informs of a change in subscriber information, is received, the mobile terminal automatically stores changed subscriber information instead of the existing information. That is, when a text message is received, the controller 110 checks whether the received text message is a message, which informs of a changed phone number, and if the message is a message, which informs of the changed phone number, the controller 110 performs a process of changing the phone number registered in the phonebook of the memory 120 to the unregistered phone number included in the message.

Referring to FIG. 2, when a text message is received, the controller 110 senses the reception (211), and analyzes the received text message (213). Thereafter, the controller 110 checks whether there is number data which has the same ciphers as those of a phone number in the message content as a result of the message analysis (215). If there is such number data, the controller checks whether there are two or more phone numbers in the message (217). At this time, if there are two or more phone numbers in the content of the message, the controller 110 checks the phonebook of the memory 120 and checks whether the phone number is registered in the phonebook (219). In case one phone number is registered in the phonebook, the controller 110 considers the phone number of the person, who sent the message, changed, and displays a pop-up message that informs of a phone number change (221) in the display unit 140. Thereafter, if a user requests storing changed phone number instead of the existing phone number, the controller 110 senses the request (223), and selects a phone number, which is not registered in the phonebook, from the text message, and stores the phone number selected in the phonebook of the corresponding subscriber instead of the existing phone number (225). That is, if a phone number update is requested, the controller 110 updates the phone number 01012345678 to 01098765432.

That is, in FIG. 2, when a text message shown in Table 1 is received, it is analyzed whether there is number data which has the same ciphers as those of a phone number in content of the message, and if there is such number data, the phone numbers (010-1234-5678 and 010-9876-5432) of the received text message are searched from the phonebook. At this time, if the phone number 010-1234-5678 is found in the phonebook, a pop-up message, which asks the user whether he wants to store the new unregistered phone number of the corresponding subscriber instead of the existing phone number in the phonebook, is generated and displayed. In addition, if the user requests storing the new phone number, the phone number of the corresponding subscriber is updated to the new phone number.

FIG. 2 illustrates an example where two phone numbers are included in a text message, but it is possible to perform the above process for the content of the text message including more than two phone numbers. As shown in Table 1, phone number change information messages transmitted from communication service providers have certain rules, and thus it is possible to update phone numbers using such rules. That is, in Table 1, a word "change" as well as phone numbers is used. Hence, the controller 110 can search a phone number or a certain word (here, "change") in the text message, and update the phone number. If it is sensed that a phone number is included in a text message (215), the controller senses whether a certain word (For example, in Table 1, the word "change") is included (217), and if a certain word is included, it is checked whether there is a phone number registered in the phonebook among phone numbers included in the text message (219) and the remaining procedure can be performed.

In case a change of a phone number is informed, such an informing message as shown in Table 1 includes a phone number before change and a phone number after change. Hence, the controller 110 senses that a plurality of phone numbers are included in the message content by performing steps 215 and 217 in FIG. 2, and checks whether a certain word (for example, a "change" in case of Table), which informs of a change of a phone number, is included in the message content. Thereafter, the remaining procedure can be performed.

Figure 3:
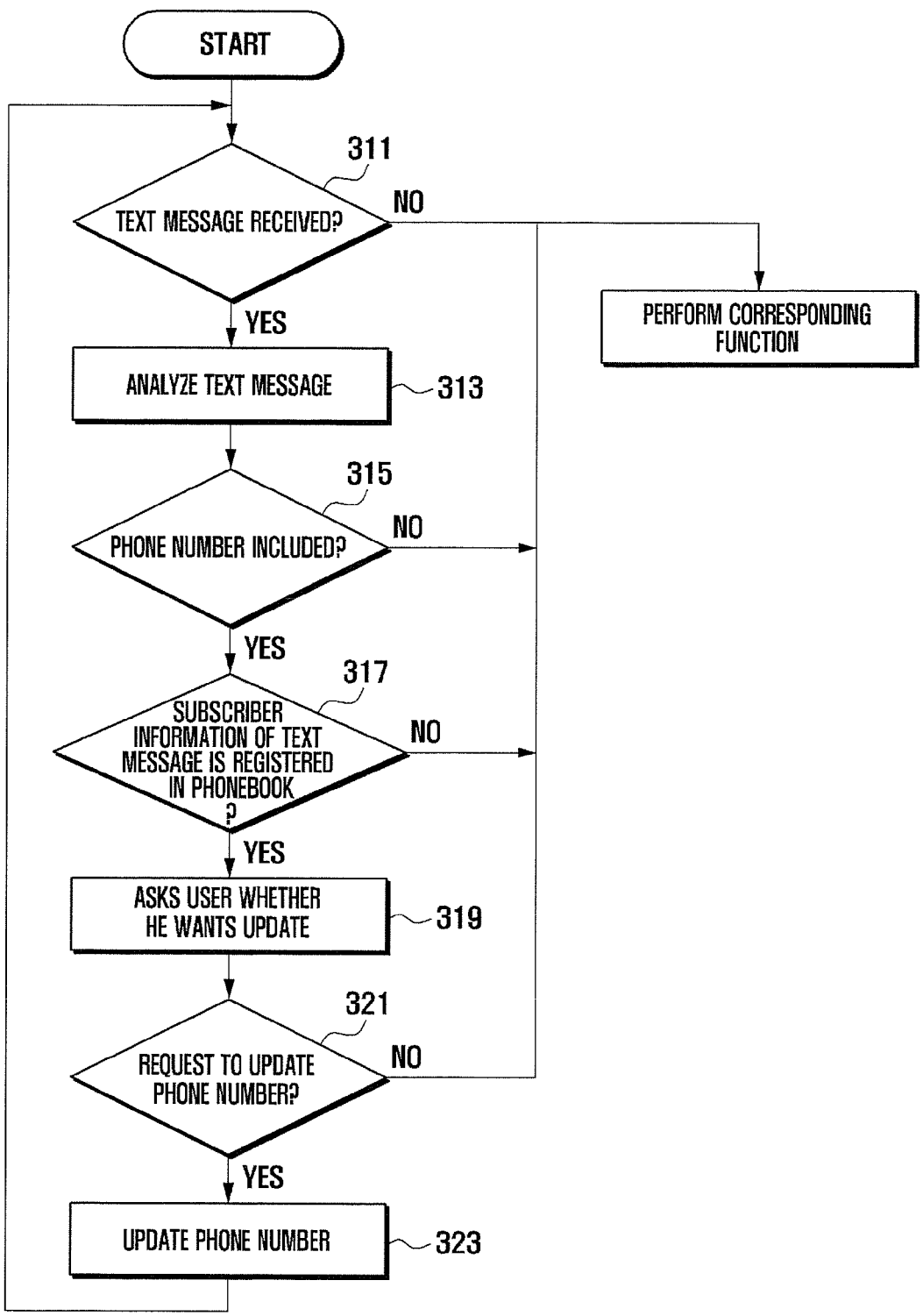
FIG. 3 illustrates a process of storing a changed phone number instead of the existing phone number by analyzing a text message in a mobile terminal according to the present disclosure.

FIG. 3 is a flowchart illustrating a process of storing a changed phone number instead of the existing phone number by analyzing a text message in a mobile terminal according to the present disclosure.

Referring to FIG. 3, in case the phone number of a user of mobile terminal is changed by a terminal change, etc., a text message, which informs of a phone number change of the user, is sent to the user's acquaintances. At this time, the text message may have a format as shown in Table 2 below.

TABLE 2

Sender: 01098765432
Hello! I have changed my phone. My phone number has been changed from 01012345678 to 010-9876-5432.
- - -

If a text message is received, the controller 110 senses the reception (311), and analyzes the received text message (313). At this time, if a phone number is included in the text message, the controller 110 senses that a phone number is included in the text message (315), and if the phone number of the subscriber, who sent the message, is not registered in the phonebook, it is checked whether one of the phone numbers included in the text message is registered in the phonebook. At this time, in case the phone number of the subscriber, who sent the message, is not registered in the phonebook and one of the phone numbers included in the text message is registered in the phonebook, the controller 110 senses such a situation (317), and displays a pop-up message, which informs of the phone number change of the subscriber, in the display unit (319). Thereafter, if a signal that requests updating the phone number is received from the user through the input unit 150, the controller 110 senses the reception (321), and updates the phone number of the subscriber included in the text message to the phone number of the subscriber who sent the text message (323). That is, if a request to store a changed phone number is made, the controller 110 updates the phone number 01012345678 to 01098765432 in the phonebook of the corresponding subscriber.

As described above, if a text message is received, the controller 110 analyzes whether phone number format letters (e.g. area code/country code, the number starts with 010, 011, 016, 017 or 019, and the ciphers are the same as those of a phone number) are included in the received message. Further, in case phone number format letters are included in the message, the controller 110 checks whether the phone number included in the message is a phone number registered in the phonebook, and if the phone number of the subscriber, who sent the message, is included in the phonebook, the controller 110 generates a pop-up message, which asks the user whether he wants to store the phone number of the subscriber instead of the existing phone number, is generated and displayed. Further, if an input, which requests storing a changed phone number, is generated through the input unit 150, the controller 110 updates the phone number stored in the phonebook of the memory 120 to the phone number of the subscriber who sent the message.

As shown in Table 2, in case the phone number is changed, the terminal sends the user a text message that informs his acquaintances of the phone number change. At this time, the text message can include a phone number before change and a phone number after change. Hence, if the phone number included in the message is a phone number registered in the phonebook, the controller 110 can display the phone number update information as a pop-up message and automatically store the changed phone number of the subscriber, who sent the message, instead of the existing phone number by the user's request as described above. At this time, as shown in Table 2, the message, which informs of a phone number change, may include certain words such as "change" and "changed", etc. Hence, if it is confirmed that a phone number is included in the text message at step 315, it is checked whether the above-described certain word is included in the text message, and if one of such certain words is included in the text message, the process proceeds to step 317 to perform the remaining procedure.

FIGS. 2 and 3 illustrate a process of automatically storing the changed phone number of a subscriber instead of the existing phone number in case a text message, which informs of the phone number change of the subscriber, is received according to the present disclosure. At this time, the subscriber information used in a mobile terminal may include other subscriber information like an e-mail address as well as a phone number. An e-mail, a multi-mail, a Twitter, and an open mail, etc. as well as a text message may be included.

Figure 4:
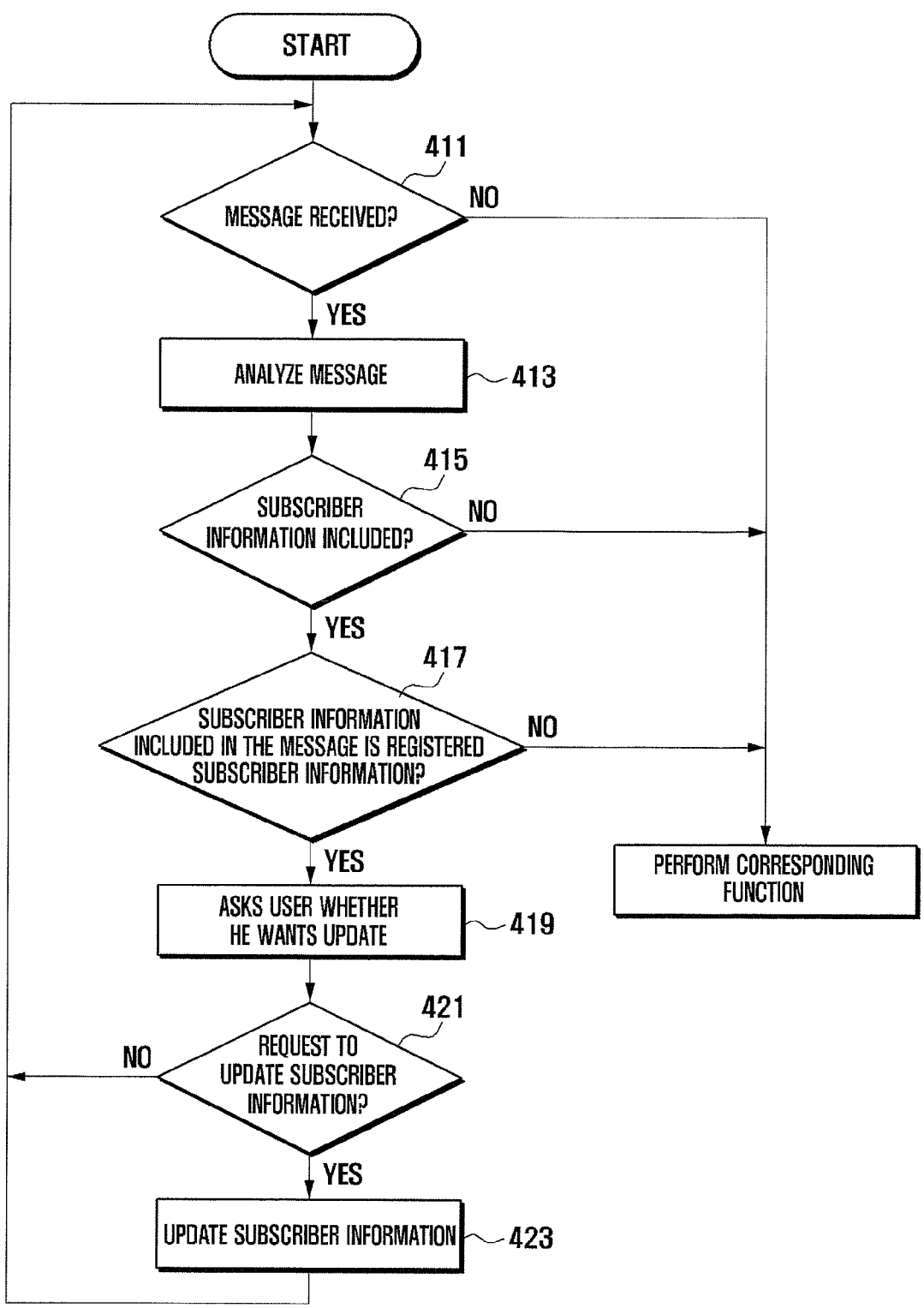
FIG. 4 illustrates a process of automatically storing changed subscriber information instead of the existing subscriber information by analyzing a received message in a mobile terminal according to the present disclosure.

FIG. 4 is a flowchart illustrating a process of automatically storing changed subscriber information instead of the existing subscriber information by analyzing a received message in a mobile terminal according to the present disclosure. Here, the message may be an e-mail, a multi-mail, a Twitter message, and an open mail as well as a text message as described above, and the subscriber information may be address information of such mails as well as the phone number.

Referring to FIG. 4, if a message is received, the controller 110 senses the reception (411), and analyzes the message (413). At this time, the message may be a text message, an e-mail, a multi-mail, a Twitter and an open mail, etc. At this time, if subscriber information is included in the received message, the controller 110 senses such a situation (415), and checks whether the subscriber information is information registered in the memory 120 (417). Here, the subscriber information may be a phone number and/or an e-mail address, etc. as described above. At this time, if a plurality of sets of subscriber information is included in the message content, and one of the subscriber sets of information is registered in the memory 120, the controller 110 displays a pop-up message, which informs of a subscriber information change, is displayed in the display unit 140 (419). Here, in case subscriber information has been changed in the communication service provider, etc., and another subscriber tries to have a connection by inputting subscriber information before change, the message may be a message, which informs the subscriber, who requested a connection, of the changed subscriber information before change and subscriber information after change. At this time, the controller 110 checks whether one of the subscriber information sets included in the message is registered at step 417, and it is possible to further include a process of checking whether a certain word (e.g., "change" and "changed", etc.), which indicates a subscriber information change, is included in the message. If the user, who read the pop-up message, requests storing changed subscriber information, the controller 110 senses the request (421), and stores the subscriber information included in the message in the information area of the subscriber of the memory (423).

Further, the user of the mobile terminal may send a message that informs of his subscriber information change. In such an example, the subscriber information of the user, who sent the message, may be unregistered subscriber information, and the subscriber information included in the message may be subscriber information before change and subscriber information after change in the form of Table 2. In such an example, it is possible to automatically store changed subscriber information instead of the existing subscriber information while performing steps 417 to 423.

Further, when changed subscriber information is informed to acquaintances through a message, it is possible to send a message including only changed subscriber information. At this time, both the subscriber information of the user, who sent the message, and information included in the message can be unregistered subscriber information. In addition, in such an example, the subscriber information of the user, who sent the message, and subscriber information included in the message can be the same subscriber information. An example of such a message is shown in Table 3 below.

TABLE 3

Sender: 01098765432
Hello! I am Hong Gil-Dong. I have changed my phone, and my phone number has been changed to 010-9876-5432.
---

In such an example, the controller 110 analyzes the received message, and as a result of the analysis, if the message includes subscriber information, the controller 110 checks whether the subscriber information of the message sender and the subscriber information included in the message are the same. At this time, if the two sets of subscriber information are the same, the controller 110 compares words constituting the text message with the subscriber name of the phonebook. If there is a subscriber having the same name (e.g., Hong Gil-dong and Gil-dong, etc.), the controller 110 can generate and display a pop-up message, which informs of subscriber information change, and store the subscriber information of the message sender corresponding to the name of the subscriber instead of the existing subscriber information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for storing subscriber information in a mobile terminal, the method comprising:
   determining whether a message includes subscriber information by analyzing characters in a message body of the message in response to receiving the message;
   determining whether the subscriber information corresponds with registered subscriber information on the mobile terminal in response to the message including the subscriber information, wherein determining whether the subscriber information corresponds with registered subscriber information on the mobile terminal comprises determining whether the subscriber information in the message is registered with a contacts list for the mobile terminal; and
   updating the registered subscriber information to different subscriber information from the message in response to the registered subscriber information being present, wherein updating the subscriber information comprises:
      generating and displaying a pop-up message including a request whether the registered subscriber information should be updated in response to the subscriber information included in the message being registered subscriber information; and
      updating the registered subscriber information to the different subscriber information included in the message in response to receiving a request to update the registered subscriber information.

2. The method of claim 1, wherein the message includes two sets of subscriber information and wherein one set of subscriber information is registered subscriber information and another set of subscriber information is unregistered subscriber information.

3. The method of claim 2, wherein the subscriber information is a phone number.

4. The method of claim 3, wherein the message is a text message.

5. The method of claim 2, wherein the subscriber information is an e-mail address.

6. The method of claim 1, wherein updating the subscriber information comprises:
   updating a registered phone number in a phonebook stored on the mobile terminal to an unregistered phone number included in the message when the message is a phone number change message.

7. The method of claim 1, further comprising:
   in response to determining that the message includes the subscriber information, determining whether a word in the message body of the message indicates that the message includes changed subscriber information,
   wherein determining whether the subscriber information corresponds with registered subscriber information on the mobile terminal is performed in response to determining that the determining a word in the message body of the message indicates that the message includes changed subscriber information.

8. A method for storing a phone number in a mobile terminal, the method comprising:
   determining whether a text message is a phone number change message by analyzing characters in a message body of the text message in response to receiving the text message;
   determining whether a phone number in the text message is registered with a contacts list for the mobile terminal; and
   updating a registered phone number in a phonebook to an unregistered phone number included in the text message in response to the text message being a phone number change message, wherein updating the registered phone number comprises:
      generating and displayinq a pop-up message including a request whether the registered phone number should be updated in response to receiving the phone number change message; and
      updating the registered phone number in the phonebook to the unregistered phone number included in the text message in response to receiving a request to update the registered phone number.

9. The method of claim 8, wherein the text message includes two sets of subscriber information and wherein one set of subscriber information is registered subscriber information and another set of subscriber information is unregistered subscriber information.

10. The method of claim 8, wherein determining whether the text message is a phone number change message comprises:
   determining whether the text message includes an update to a phone number registered with the contacts list for the mobile terminal; and
   determining whether a word in the message body of the text message indicates a change in a phone number of a contact in the contacts list for the mobile terminal.

11. A device for storing subscriber information in a mobile terminal, the device comprising:
   a communication unit configured to receive a message;
   a memory configured to store a phonebook;
   a display unit configured to display the message; and
   a controller configured to analyze characters in a message body of the message to determine whether the message includes subscriber information; determine whether the subscriber information in the message is registered with the phonebook for the mobile terminal; generate a pop-up message requesting whether the registered subscriber information should be updated for display by the display unit; and update, responsive to the message including subscriber information registered with the phonebook in the memory and responsive to receiving a request to update the registered subscriber information, the registered subscriber information to different subscriber information included in the message.

12. The device of claim 11, wherein the message includes two sets of subscriber information and wherein one set of subscriber information is registered information and another set of subscriber information is unregistered subscriber information.

13. The device of claim 12, wherein the subscriber information is a phone number.

14. The device of claim 13, wherein the message is a text message.

15. The device of claim 11, wherein the controller is further configured to update a registered phone number in the phonebook to an unregistered phone number included in the message when the message is a phone number change message.

16. The device of claim 11, wherein the subscriber information is an e-mail address.

* * * * *